Aug. 5, 1930.  F. H. HOPKINS  1,772,004
RELIEF RING FOR SAFETY VALVES
Filed June 22, 1928  3 Sheets-Sheet 1

Inventor:
Frank H. Hopkins.
by Wright, Brown, Quinby & Hay
Att'ys.

Aug. 5, 1930.   F. H. HOPKINS   1,772,004
RELIEF RING FOR SAFETY VALVES
Filed June 22, 1928   3 Sheets-Sheet 2
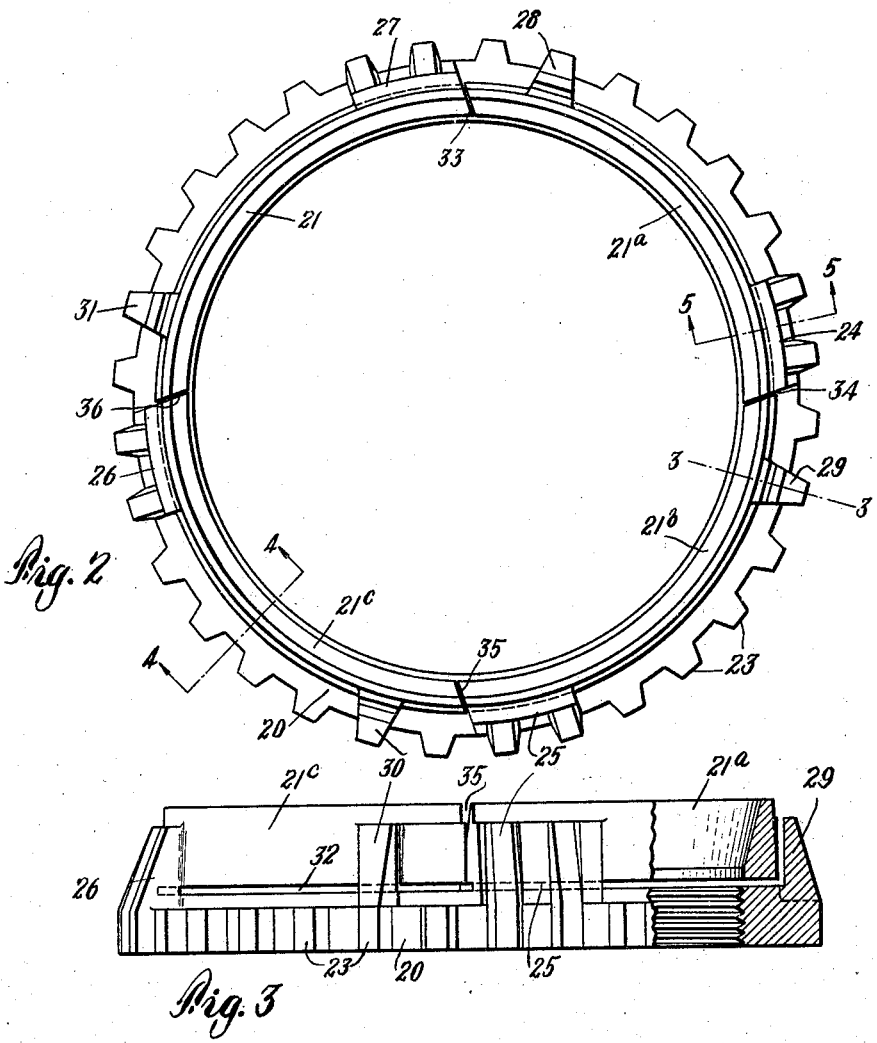
Fig. 2
Fig. 3
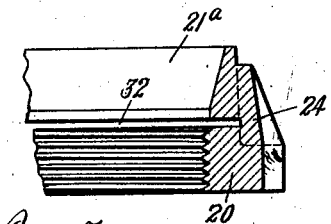
Fig. 5
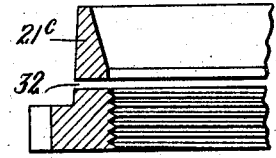
Fig. 4
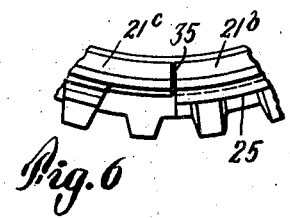
Fig. 6
Inventor:
Frank H. Hopkins.
by Wright, Brown, Quinby they
Attys.

Aug. 5, 1930.   F. H. HOPKINS   1,772,004
RELIEF RING FOR SAFETY VALVES
Filed June 22, 1928   3 Sheets-Sheet 3

Inventor:
Frank H. Hopkins.
by Wright, Brown, Quinby & May
Attys.

Patented Aug. 5, 1930

1,772,004

UNITED STATES PATENT OFFICE

FRANK H. HOPKINS, OF WORCESTER, MASSACHUSETTS, ASSIGNOR TO CONSOLIDATED ASHCROFT HANCOCK COMPANY, INC., OF NEW YORK, N. Y., A CORPORATION OF MARYLAND

RELIEF RING FOR SAFETY VALVES

Application filed June 22, 1928. Serial No. 287,622.

This invention relates to safety or relief valves for steam boilers and other equipment containing an expansible fluid under pressure. It is more particularly concerned with safety valves of the pop type and the relief rings with which such valves are commonly provided to cause a desired high lift of the valve when opened by fluid pressure, and by the adjustment of which the blow back or loss of pressure occurring before the valve again closes is regulated. Its object, generally stated, is to improve relief rings of this type in such fashion that the discharge capacity of the valve may be increased without increasing the blow back. In order to explain my purpose and the principles and means by which I have accomplished it in accordance with this invention, a brief discussion of the characteristics and principles of pop safety valves and their relief rings may be helpful.

In such valves the member which opens and closes the escape passage is ordinarily called the valve proper and is loaded by a weight or spring, usually a spring, with provision for adjustment of the loading force. The valve proper is formed with a lip overhanging its seat to provide a reaction surface for the impact of the escaping steam. An adjustable ring, known as the relief adjusting ring or blow back adjusting ring, is commonly provided to surround the valve seat and overlap the reaction lip of the valve proper, with an intermediate annular space around the reaction lip. Such ring is frequently called for convenience a relief ring and I will use that term generally in the following specification to designate the adjusting rings of that character.

The function of the relief ring is to cooperate with the reaction lip of the valve proper in causing the escaping steam to open the valve widely and hold it open until enough steam has escaped to relieve the pressure. In its performance of this function it so obstructs or baffles the escaping steam that a lifting force is exerted on the reaction lip additional to the static pressure of the steam on the area of the valve proper which covers the escape passage in the valve base. The width of the reaction lip, the form and taper of its outer peripheral surface, the form and taper of the surrounding interior surface of the relief ring, the width of the annular space between these surfaces, and the stiffness of the loading spring are all determined according to principles of design well understood by engineers and manufacturers of valves to obtain the maximum feasible lift and discharge capacity of safety valves designed to operate under different steam pressures and having different areas of valve seat passage.

The extent to which the relief ring overlaps the valve proper is also a factor in the design by which the lift of the valve proper is controlled and, in general, as the overlap is made greater or less, so will the lift of the valve be greater or less. But this factor also influences the drop in pressure (called blow back in the art) which will occur in the boiler before the valve closes again after having been opened. It is not possible to make a safety valve which will open, in relieving a given pressure, to the extent necessary to prevent the objectionable sizzling and fluttering to which relief valves other than those of the pop type are subject, without permitting an appreciable drop of pressure before again closing. It is important to make the blow back as small as possible in order to avoid waste of steam, and manufacturers of safety valves are limited by the boiler code of the American Society of Mechanical Engineers to a maximum blow back of four per cent of the relief pressure. That is, if the pressure at which the valve is set to open is 200 pounds, the boiler pressure must not be allowed to drop below 192 pounds before the valve closes. To meet this practically essential condition, the relief rings are made adjustable so that, after having been constructed and set up according to a design intended to obtain a given lift and discharge capacity, they may be moved to shorten the extent of overlap in case the blow back is found under test to be too great. In this way it is possible to adjust any safety valve of proper design so that the blow back will not exceed the permissible maximum, but this is accomplished at the sacrifice of desired discharge capacity, because the same adjustment which lessons the blow back also reduces the lift of the valve proper.

With the foregoing explanation in mind, it will be apparent that an improvement in the relief ring which increases the discharge capacity of the valve without increasing the blow back, or permits a given discharge capacity with diminished blow back, is to be desired. This object has been accomplished in accordance with this invention by making the relief ring with the usual provision for manual adjustment to regulate the blow back and with a new capacity for self adjustment to permit a freer and more rapid passage of escaping steam when the valve is opened. The invention consists in a new construction of relief ring for the purpose set forth, having the self adjusting characteristics thus indicated, and in the combination between such relief ring and the other essential elements of a pop safety valve. An embodiment of the invention will now be described in connection with the accompanying drawings, but without limitation of the principles and scope of the invention to this specific embodiment.

In the drawings,—

Fig. 2 is a plan view of the relief ring removed from the safety valve and shown on a larger scale than that of Fig. 1;

Fig. 3 is in part an elevation of the relief ring shown in Fig. 2, and in part a section on line 3—3 of said figure;

Figure 1:
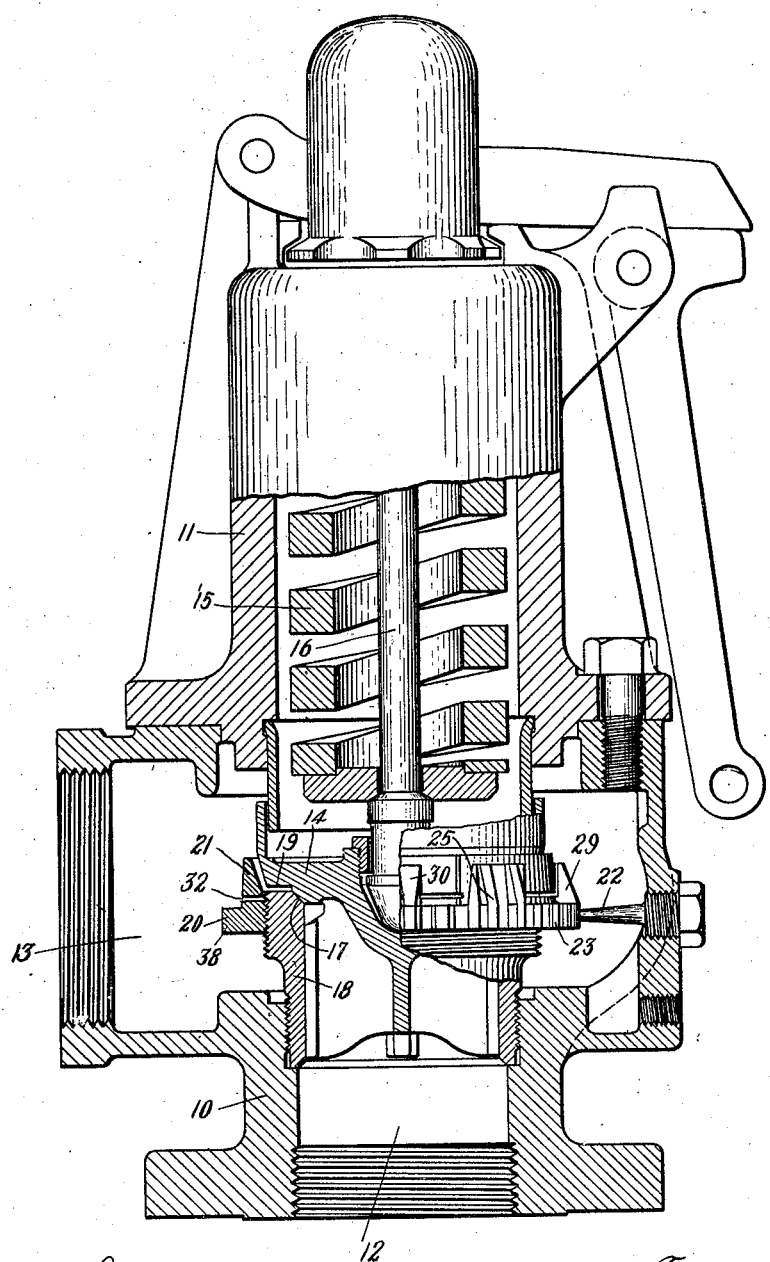
Fig. 1 is a sectional view of a pop safety valve equipped with my new relief ring.
Figure 7:
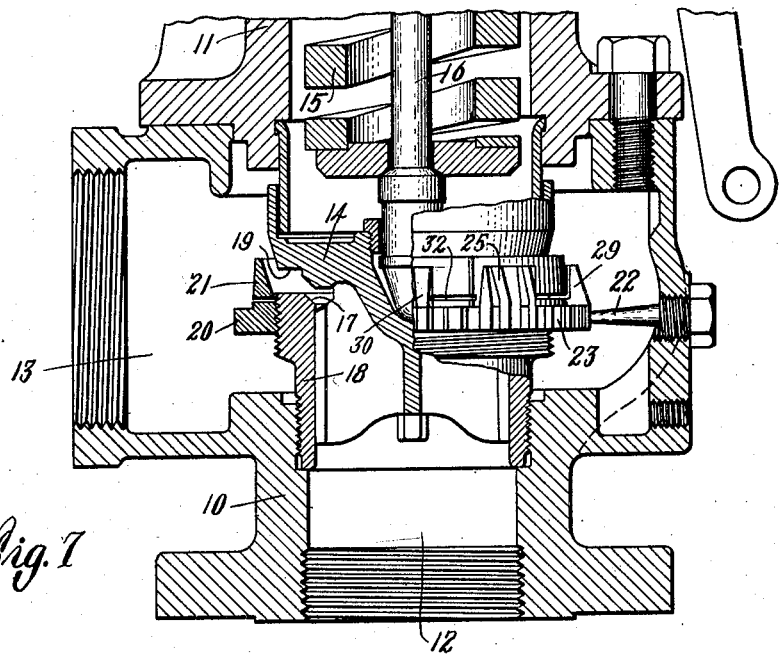
Figure 8:
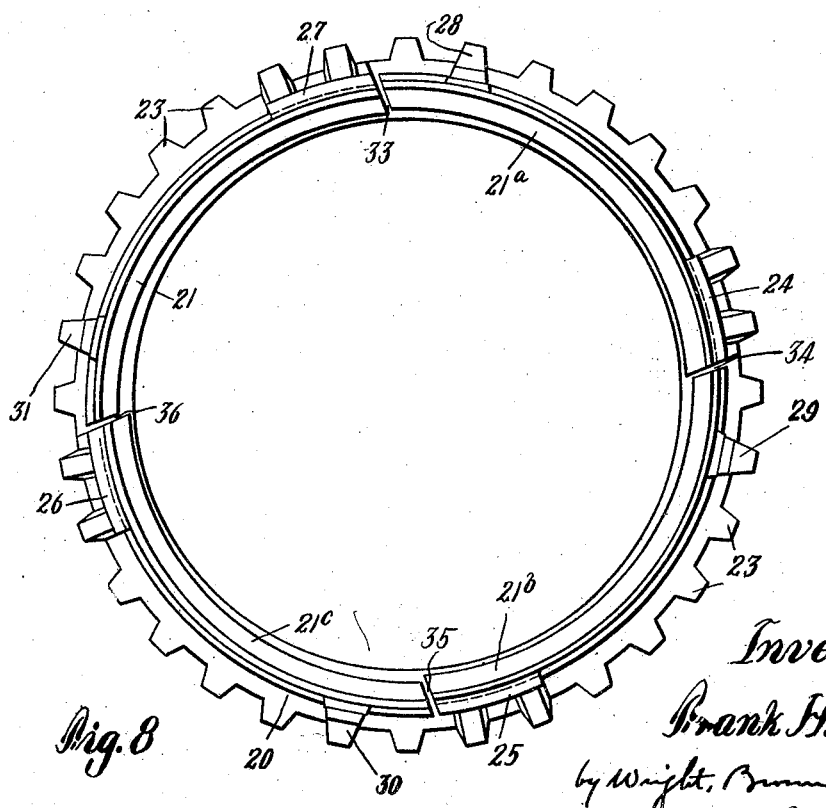

Figs. 4 and 5 are detail sectional views taken on lines 4—4 and 5—5, respectively, of Fig. 2;

Fig. 6 is a fragmentary plan view showing a modification in a detail of construction of the relief ring;

Fig. 7 is a fragmentary sectional view similar to Fig. 1, but showing the valve proper in open position;

Fig. 8 is a plan view similar to Fig. 2 of the relief ring, but showing it as distorted by escaping steam.

Like reference characters designate the same parts wherever they occur in all the figures.

Before proceeding to a detailed description of the valve thus illustrated, I may remark that valves of the type here shown are generally set in upright position with the valve proper above the seat and adapted to rise or lift in opening, and that the relief ring is lowered to decrease the amount of its overlap and thus decrease the blow back. In this specification I will assume for convenience that the valve proper and relief ring have this arrangement, but without intent to limit the invention as to the arrangement of the parts or the position in which the valve may be mounted for use. Hence the terms "lift," "rise" and other terms of similar import are used herein not only with their specific meanings as related to the drawings and the usual arrangement of a safety valve, but also in a generic sense as meaning movement in a direction away from the valve seat, whatever may be the absolute direction of such movement. I wish to state also that in referring herein to the use of the valve in connection with steam pressure, I have not intended to imply any limitation of use, but that steam may be considered as typifying any expansible fluid, whether in a boiler or any other container or conduit which may be controlled by a safety valve.

In the drawings, 10 represents the base and 11 the bonnet forming the casing of a safety valve and having an inlet 12 to be connected with a steam boiler, or other container of fluid under pressure, and an outlet 13. 14 is the valve proper pressed upon by a spring 15, acting through a spindle 16, toward a seat 17 which is formed on a bushing 18 mounted in the inlet passage of the base. The valve proper is provided with a lip overlying the valve seat and having a reaction surface 19 to receive the impact of the steam flowing when the valve is open, to convert the velocity energy of the steam into force supplementing the static pressure so as to obtain an instant wide opening of the valve and cause it to remain open until the pressure has been sufficiently relieved. 20 represents a relief ring which surrounds the valve seat, being screw threaded thereon to permit adjustment axially, and has an axially extending part overlapping the valve proper and separated from the latter by an intermediate annular space. A locking pin 22 is removably screwed into the casing and extends into locking engagement with external teeth 23 on the relief ring to retain the latter in adjusted position.

As thus far described, the safety valve does not differ in principle from any safety valve of the pop type already known, and represents a standard design of such valve now on the market. Other designs of valve may differ in detail, as in the contours of the reaction surface and of the relief ring, and in other particulars; but in principle they are all essentially the same as above described. However, although the relief ring of the present valve is like those of the prior art in that it overlaps the valve proper and is adjustable to increase or reduce the extent of overlap, it also differs materially from prior relief rings by new features and characteristics which accomplish the new and improved results of the present invention, as will now be described.

According to this invention, the overlapping part of the relief ring is composed of segments represented in the detail views as 21, 21$^a$, 21$^b$ and 21$^c$, which collectively form an interrupted annulus, and each of which is secured at one end to the base or body part of the ring and is otherwise free to swing and flex outwardly throughout the balance of its length. Preferably the ring is made of a single piece of forged or cast steel, cast iron, or other suitable material with the prescribed dimensions, internally threaded, and provided externally with peripheral locking teeth 23 adjacent to one end, which end may be called the base part of the ring and to which the reference numeral 20 is applied. The opposite end, which forms the overlapping portion 21, is formed with the proper internal contour, according to well understood principles, to impede escaping steam as necessary to control lift of the valve proper; and has a smaller external radius than the base part, except at separated points where segments 24, 25, 26, 27, 28, 29, 30, and 31 of greater external thickness are left. For purposes of this description I call such segments lugs. A transverse slot or groove 32 is cut between the parts 20 and 21 of the ring of sufficient depth to sever and separate these parts from one another except only at the lugs. Such groove is cut from the inner circumference of the ring outwardly to an extent at least as great as the external radius of the part 21, but not through the lugs. Axially extending slots are also cut tangentially of the outer circumference of the part 21 through the lugs 28, 29, 30 and 31 to an intersection with the groove 32. The part 21 is further cut transversely adjacent to each of the lugs 24, 25, 26 and 27, whereby cuts 33, 34, 35 and 36 are made which divide this part of the ring into the segments 21, 21$^a$, 21$^b$ and 21$^c$, previously mentioned. Such segments thus remain in integral union at one end with the base of the ring, but are otherwise free and independent of the base and of each other. The thickness of these segments is designedly made such that, having regard to their length, the stiffness and elasticity of the material, and the fluid pressure to which the ring is exposed, they will flex and spring outward under steam pressure. I prefer to limit the extent of such movement by positive stops, and for that reason I provide the lugs 28, 29, 30 and 31, previously mentioned, which rise from the base part 20 outside of the segments and are separated from the latter by the width of the tangential cuts.

Preferably the dividing slot 32 is located between the limits of that part of the ring which is internally threaded and closely surrounds and fits the exterior of the bushing 18, so that when the segments are in the unstressed and unflexed position they embrace the bushing and the slot 32 is closed or obstructed thereby. And also the cuts between the adjacent ends of the respective segments are made as narrow as possible. They may be tangential to a circumference concentric with the ring, as shown in Figs. 2 and 8, and the segments may be given an initial set such that the cuts are entirely closed normally in order to provide the least possible avenue for escape of steam, except the normal annular space between the inner surface of the ring and the outside of the valve proper, before the segments have been sprung outward. It is not essential, however, that the cuts should have this tangential arrangement, and they may be arranged radially, as shown in Fig. 6.

My improved relief ring functions the same as the ordinary relief ring in securing a desired opening or lift of the valve proper. The relief capacity of the safety valve is determined primarily by the distance of separation of the valve proper from its seat, and this separation is determined by the use of my ring, as usual. When the steam pressure is great enough to lift the valve proper, the first effect of the outflowing steam is to strike the outlying reaction surface 19 and raise the valve proper until the space between its seating face and the valve seat bears the ratio to the width of the annular space between the lip of the valve proper and the relief ring which establishes a balance between the closing spring and the steam force. Immediately thereafter, the steam pressure flexes the spring segments of the relief ring outwardly, as indicated in Fig. 8, enlarging this annular space and also opening a channel around the outer edge of the valve seat to the slot 32 and opening the spaces between the contiguous ends of the adjacent segments. This greatly facilitates escape of the steam after passing the seating face of the valve proper and diminishes the effect which the relief ring has in causing the valve proper to remain open after the boiler pressure has begun to drop. Hence the valve will close again before the pressure has dropped as much as would be necessary with a relief ring of previous design when set to cause an equivalent initial lift of the valve proper.

I have found as the result of extensive experiments that it is possible to set the relief ring of this invention higher in relation to the valve proper and get a higher lift and larger escape capacity than with the use of relief rings of the types previously known, with the same amount of blow back. That is, the flexibility of the overlapping segments permits a design of relief ring which gives a greater overlap than is possible with a solid ring, while still keeping the blow back within the permissible limit. It has thus been possible to assure an increase of 25% in the capacity rating of this type of valve. It might be observed that a slight change in the position of the relief ring makes a large difference in the action of the valve in any case, from which it will be understood that even a slight deflection of the segments in my improved relief ring, in addition to the opening provided by the slot 32, has a marked effect in controlling the closing of the valve.

It is to be understood that the relief ring may be made with more or fewer segments than the number herein shown, and that such segments may be united or attached to the body of the ring in other ways than that disclosed, all within the spirit of this invention and the scope of the protection which I claim for it. Essentially the relief ring embodying this invention is automatically self adjusting to permit an increased escape of steam after having caused a given lift of the valve proper, and it is manually adjustable to control the extent of the blow back. In the use of the term "manually" herein I have intended to include any mode of adjustment which is effected in any manner otherwise than automatically by the action of the escaping steam. And in speaking of the "lift" of the valve proper I have had reference to the position of the valve here shown and its customary placement, but have not intended to imply any limitation of arrangement of parts or placement of the valve as a whole.

What I claim and desire to secure by Letters Patent is:

1. A safety valve comprising a valve proper, a seat therefor and a relief adjusting ring surrounding the valve seat and overlapping the valve proper with an annular space between its overlapping part and the valve proper, said ring being adjustable manually to vary the extent of its said overlap and being automatically adjustable under pressure of outflowing fluid when the valve is open to increase the space volume available for escape of the fluid.

2. A safety valve comprising a valve proper, a seat therefor and a relief adjusting ring adjustable manually to determine the amount of blow back and being self adjusting under pressure of escaping fluid to enlarge the space contiguous to the valve proper for escape of the fluid.

3. A safety valve comprising a valve proper, a seat therefor and a relief adjusting ring manually adjustable and automatically self adjusting to secure increased opening of the valve proper by a given fluid pressure without increase in the pressure drop required to cause reseating of the valve.

4. In a safety valve, a relief ring having a base and an axially extended annulus formed of segments each attached at one of its ends to said base and otherwise free to move relatively thereto.

5. In a safety valve, a relief ring comprising a base and an axially extended annulus consisting of segments each rigidly connected at one end to said base but otherwise separated from each other and from the base and of elastic structure adapted to be flexed outwardly by pressure of the fluid released by said safety valve.

6. In a safety valve, a relief ring comprising a base and an axially extended annulus consisting of segments each rigidly connected at one end to said base but otherwise separated from each other and from the base and of elastic structure adapted to be flexed outwardly by pressure of the fluid released by said safety valve, and stops interposed between the free ends of the segments and the said base arranged to limit the outward flexure of said segments.

7. In a safety valve, a relief ring slotted in a plane perpendicular to its axis and divided by transverse cuts to form a continuous annular base in one end part and a divided annulus in the opposite end part, said annulus and base being integrally united in part and otherwise separated, and the separated part of the annulus being elastically expansible under pressure of fluid escaping from the valve.

In testimony whereof I have affixed my signature.

FRANK H. HOPKINS.